(12) United States Patent
Blase

(10) Patent No.: US 6,354,070 B1
(45) Date of Patent: Mar. 12, 2002

(54) FLEXIBLE CABLE GUIDE WITH DETACHABLE GUIDE LINKS

(75) Inventor: Günter Blase, Bergisch (DE)

(73) Assignee: Igus Spritzussteile für die Industrie GmbH, Köln (DE)

(*) Notice: Subject to any disclaimer, the term of this patent is extended or adjusted under 35 U.S.C. 154(b) by 0 days.

(21) Appl. No.: 09/466,498

(22) Filed: Dec. 17, 1999

(30) Foreign Application Priority Data

Dec. 31, 1998 (DE) .......................................... 198 60 948

(51) Int. Cl.⁷ .............................................. F16G 13/00
(52) U.S. Cl. ........................ 59/78.1; 174/135; D13/140
(58) Field of Search ........................ 174/68.1, 68.3, 174/69, 95, 97, 135; 59/78, 78.1; D13/140

(56) References Cited

U.S. PATENT DOCUMENTS

| | | | |
|---|---|---|---|
| 3,330,105 A | * 7/1967 | Weber ..................... | 59/78.1 |
| 4,769,985 A | * 9/1988 | Moritz ..................... | 59/78.1 |
| 4,907,767 A | * 3/1990 | Corsi et al. ............... | 174/97 |
| 5,638,672 A | * 6/1997 | Furukawa ................. | 59/78.1 |
| 5,649,415 A | * 7/1997 | Pea ........................ | 59/78.1 |
| 5,792,992 A | * 8/1998 | Handler .................. | 174/101 |
| 5,836,148 A | * 11/1998 | Fukao ..................... | 59/78.1 |
| 6,156,974 A | * 12/2000 | Blase ..................... | 174/68.3 |
| 6,161,373 A | * 12/2000 | Heidrich et al. .......... | 59/78.1 |

FOREIGN PATENT DOCUMENTS

| | | |
|---|---|---|
| DE | 27 08 193 | 4/1980 |
| DE | 31 39 737 C2 | 10/1981 |
| DE | 3432531 | 8/1984 |
| DE | 39 28 237 C1 | 8/1989 |
| DE | 490022 | 4/1991 |
| DE | 19512088 | 4/1995 |
| DE | 197 10 489 A1 | 3/1997 |
| DE | 196 05 775 | 9/1997 |
| EP | 0 544 027 A1 | 11/1991 |

OTHER PUBLICATIONS

PCT Search Report: K390680W0 Priority date Dec. 31, 1998.

* cited by examiner

*Primary Examiner*—Dean A. Reichard
*Assistant Examiner*—Adolfo Nino
(74) *Attorney, Agent, or Firm*—Drinker Biddle & Reath LLP

(57) ABSTRACT

The invention relates to a cable guide (1) for guiding cables or lines in a guide channel (3a), having a continuous, elongated sliding strip (2), which can be arranged to form a lower strand, a deflection zone and an upper strand guided on the lower strand in sliding fashion, where one end of the cable guide can be connected to a stationary unit and the other end to a reciprocating unit. In order to design a cable guide which can be put to flexible use with regard to the cables to be guided, it is proposed that the guide channel (3a) be constructed of numerous guide links (3) which can pivot relative to one another and which are arranged on the side of the sliding strip (2) facing away from the opposite strand and mounted on the sliding strip (2) in detachable fashion. In one configuration, the guide links (3) are provided with stops (21) to limit the pivoting angle of adjacent sections of the sliding strip (2), also limiting the movement of the guide links (3) perpendicular to their pivoting plane. (FIG. 2)

17 Claims, 11 Drawing Sheets

FLEXIBLE CABLE GUIDE WITH DETACHABLE GUIDE LINKS

FIELD OF THE INVENTION

The invention relates to a cable guide for guiding cables or the like in a guide channel, having a continuous, elongated sliding strip, which can be arranged to form a lower strand, a deflection zone and an upper strand guided above the lower strand, where one end of the cable guide can be connected to a stationary unit and the other end to a reciprocating unit.

BACKGROUND OF THE INVENTION

EP 0 490 022 B1 discloses a cable guide of this kind in which one or more cables are enclosed by a cable sheath, where a sliding device with good sliding properties is provided on the outside of the cable sheath, acting in the longitudinal direction of the cable.

A cable guide of this kind thus extends continuously over the entire length of the guided cable, meaning that the cable guide does not consist of individual, separate chain links, as is the case with energy guiding chains. As a result, the effort required to assemble this system is reduced and, on the other hand, there is no risk of the joint connections of adjacent chain links parting unintentionally, e.g. under great stress.

One disadvantage of the known cable guide is that it cannot be used flexibly with regard to the cables it guides, since the cables cannot be removed from the common cable sheath as needed and the cable sheath cannot be easily adapted to different requirements.

BRIEF SUMMARY OF THE INVENTION

Therefore, the object of the invention is to design a cable guide which can be put to flexible use with regard to the cables to be guided.

According to the invention, this object is solved in that the guide channel consists of numerous guide links which are arranged in pivoting fashion relative to each other on the side of the sliding strip facing away from the opposite strand and mounted on the sliding strip in detachable fashion. Due to their detachable mounting on the sliding strip, the guide links which guide the cables can easily be replaced by other guide links which, for example, are better adapted to the number of cables to be guided or to their cross-section. For example, guide links of different height or width, or ones with suitable interior partitions or other devices for the defined guiding of the cables, can be used for this purpose. Correspondingly, with a given design of guide link, the sliding strip can also be replaced, for example by a strip with is better adapted to the respective requirements with regard to its flexural resistance. This ensures precise lateral guidance of the cables, regardless of the stiffness of the sliding strip, this also being simple to manufacture. In this context, the upper strand can be self-supporting or guided on top of the lower strand in sliding fashion.

The guide links can be designed such that they limit the movement of the guided cables in three directions perpendicular to the longitudinal direction of the sliding strip, i.e. transverse to the sliding strip and away from the sliding strip, where the movement of the guided cables in the fourth direction is limited by the sliding strip. For this purpose, the guide links can be of essentially U-shaped design, where they are mounted on the sliding strip via the free ends of the legs.

The guide links are advantageously designed such that they limit the movement of the guided cables in four directions perpendicular to the longitudinal direction of the sliding strip. Thus, the guided cables are held together by the guide links even when they are detached from the sliding strip.

The side sections of the guide links, which limit the movement of the cables transverse to the longitudinal direction, can form a continuous side wall when the cable guide is arranged in elongated fashion. They can also be designed as webs and, for example, only extend over part of the length of the guide links. The same applies to the guide areas of the guide links running transverse to the sliding strip.

The guide links can be mounted on the sliding strip such that they touch one another or are spaced apart in the longitudinal direction of the cable guide, and they can be of one-part or multi-part design. In particular, the area of the guide links which essentially extends transverse to the sliding strip can be designed to pivot with respect to the lateral guide areas, or it can be provided with a hole, so that the cables to be guided can be inserted into the guide channel through this hole by deforming the guide links. In order to prevent the unintentional removal of the cables from the guide channel, the areas of the guide links separated by the hole can have an overlapping section.

The guide links can be mounted on the sliding strip using any suitable means. In particular, several mounting devices spaced along the side and/or longitudinal direction of the sliding strip can be provided for mounting a guide link.

Advantageously, means for mounting the guide links in non-positive and/or positive fashion are integrally moulded on the sliding strip. The mounting devices can be integrally moulded in an injection moulding or extrusion process, for example, or in a subsequent manufacturing step.

In order to mount the guide links on the sliding strip, they can be slid onto correspondingly shaped snap elements in the direction of the surface normals of the sliding strip.

According to another preferred configuration, mounting devices in the form of suitable mounting rails or mounting grooves, for example, are provided on the sliding strip, onto or into which the guide links can be slid in a direction parallel to the plane of the sliding strip, preferably perpendicular to the longitudinal direction of the sliding strip. The guide links can be locked in the target position by snap elements.

In particular, the mounting devices can be designed such that any guide link can be detached from the sliding strip without having to remove the adjacent guide links from the sliding strip. This is particularly also enabled by the fact that, according to the invention, the guide links are mounted on the side of the sliding strip facing away from the opposite strand.

The sliding strip can have a rectangular cross-section or also be profiled, thus permitting the flexural resistance of the sliding strip in the longitudinal direction to be influenced. In particular, the sliding strip can be provided with raised and receding areas extending in the longitudinal direction, where the raised areas of the upper strand and lower strand can act as sliding surfaces when the upper and lower strands are guided on top of one another in sliding fashion. The receding areas can also serve to hold mounting devices for the guide links.

Advantageously, stops are provided on the cable guide arrangement to limit the pivoting angle of adjacent sections of the sliding strip, thus allowing the radius of the deflection zone to be defined.

According to an advantageous configuration, bevels are provided on the face ends of the guide links which can be brought into contact with the corresponding bevels of the adjacent guide link at a specific pivoting angle and act as stop surfaces. In this context, the guide links can reach around the sides of the sliding strip, the bevels being provided at the height of the sliding strip.

According to another advantageous configuration, the side areas of the guide links are provided with projections extending in the direction of the adjacent guide link, which reach behind an area of the adjacent guide link and can be brought into contact with it, thereby limiting the pivoting angle of adjacent guide links.

The projections extending in the direction of the adjacent guide link can, for example, be guided past the adjacent guide link on the outside or in slots in the side parts of the guide links. The projections can be designed such that a guide channel with a closed side wall results even when the guide links are pivoted relative to one another.

The projections extending in the direction of the respective adjacent guide link have only slight play relative to the adjacent guide links and thus prevent the twisting of the sliding strip, independently of their function as stop elements.

Guide ribs can also be provided on the sliding strip as a means for limiting the movement of the guide links transverse to the sliding strip, these being arranged on the side of the sliding strip facing the opposite strand and laterally spaced apart from one another, so that corresponding guide ribs of the opposite strand can be positioned between them. The guide ribs can be integrally moulded on the sliding strip or mounted on it in detachable fashion.

The sliding strip can display uniform material properties and/or a uniform profile in its longitudinal direction. The sliding strip can also have alternating sections with higher and lower flexural resistance relative to the pivoting plane of the guide links, the material properties and/or profile of which can differ and which can, for example, be designed as integral hinges. This results in joint-like areas which are preferably positioned centrally between adjacent guide links.

The width of the guide elements can correspond to the width of the sliding strip, without this being a restriction. For example, the width of the guide links can easily be smaller or greater than the width of the sliding strip. Several guide links can also be arranged next to one another on a sliding strip and the guide links can also extend over several, adjacent sliding strips. Adjacent sliding strips can be connected by mounting devices provided on the guide links, or additional means can also be provided for this purpose. This makes it possible to connect adjacent cable guides to one another in detachable fashion, if they are to travel together.

In particular, the means for mounting adjacent cable guides can engage the adjacent sliding strips, where these means can themselves be designed in the form of a sliding strip which, advantageously, can also be independently used in a cable guide according to the invention.

The length of the cable guide can be varied by dividing the sliding strip and adding sliding strip sections.

The sliding strip and guide links can be made of the same, or different materials.

BRIEF DESCRIPTION OF THE DRAWINGS

An example of the invention is described below and explained based on the drawings. The drawings show the following.

DETAILED DESCRIPTION OF THE DRAWINGS

Figure 1:
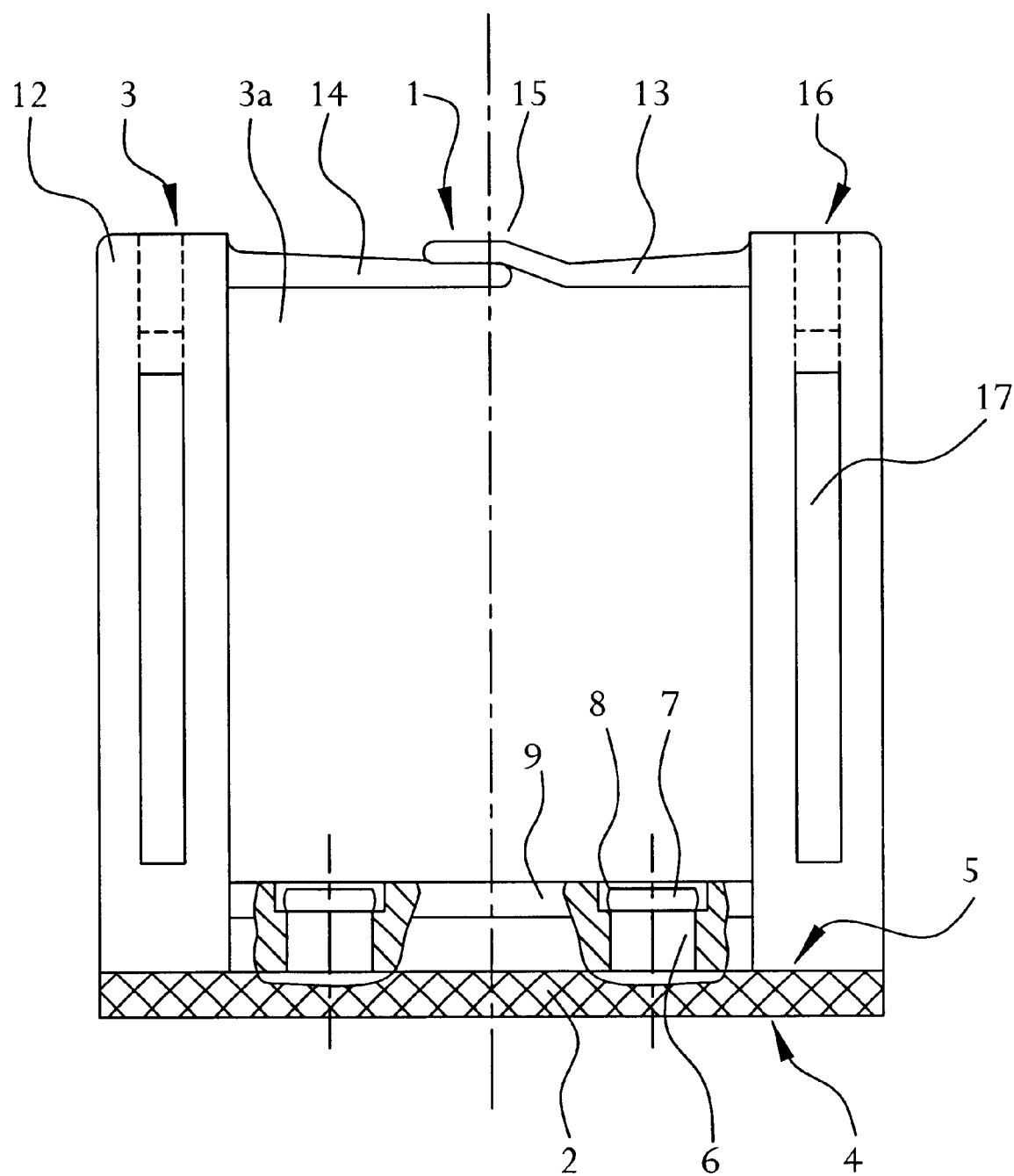
FIG. 1 A cross-section of a cable guide according to the invention.

FIG. 1 shows a cross-section of a cable guide 1, consisting of a flat sliding strip 2 with a rectangular cross-section and a guide link 3 mounted on it which encloses a guide channel 3a. Side 4 of sliding strip 2, which is positioned at the bottom when the guide link is positioned as shown in FIG. 1, serves as a sliding surface when an upper strand 49 of the sliding strip is guided on top of a lower strand 50 (see FIG. 10) in sliding fashion.

Top side 5 of the sliding strip is provided with two parallel rows of studs 6, which are integrally moulded on sliding strip 2. The free ends of studs 6 are provided with circular rims 7 which lock guide links 3 to sliding strip 2 in snap-in fashion by engaging undercut recesses 8 on the bottom of them. Studs 6 are positioned at ¼ and ¾ the width of sliding strip 2, so that, instead of guide link 3 shown, two guide links of half the width can be mounted next to one another on the sliding strip without protruding on the side.

Guide link 3 is of one-part design and includes a bottom part 9 (see FIG. 2), in which stepped recesses 8 open on both sides are located. Bottom part 9 only extends over part of the length of guide link 3 and has a front and rear end web 10 protruding beyond the base of the bottom part, the top edge 11 of which is rounded in order to prevent damage to the guided cables.

Figure 2:
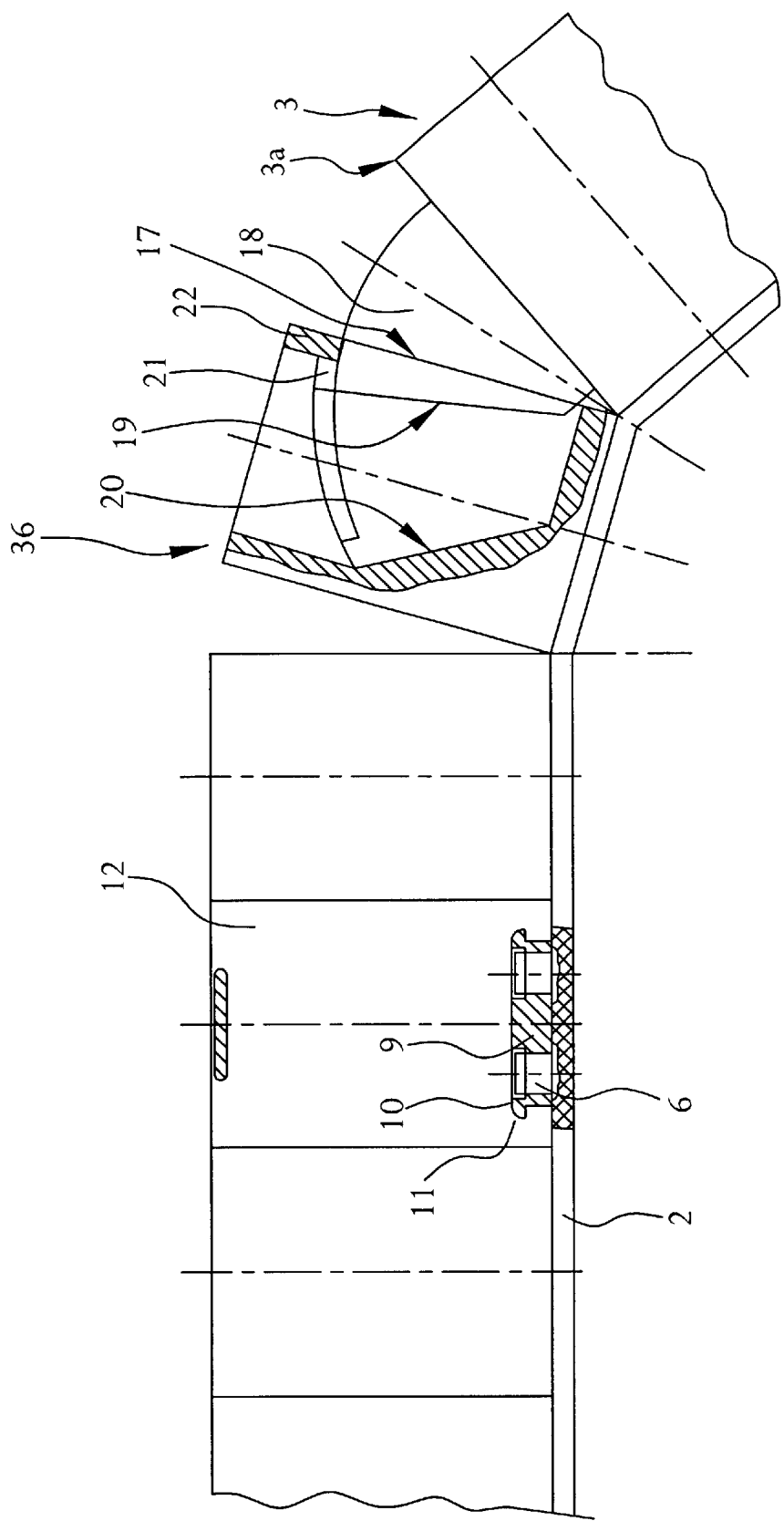
FIG. 2 A side view of the cable guide according to FIG. 1.
Figure 2A:
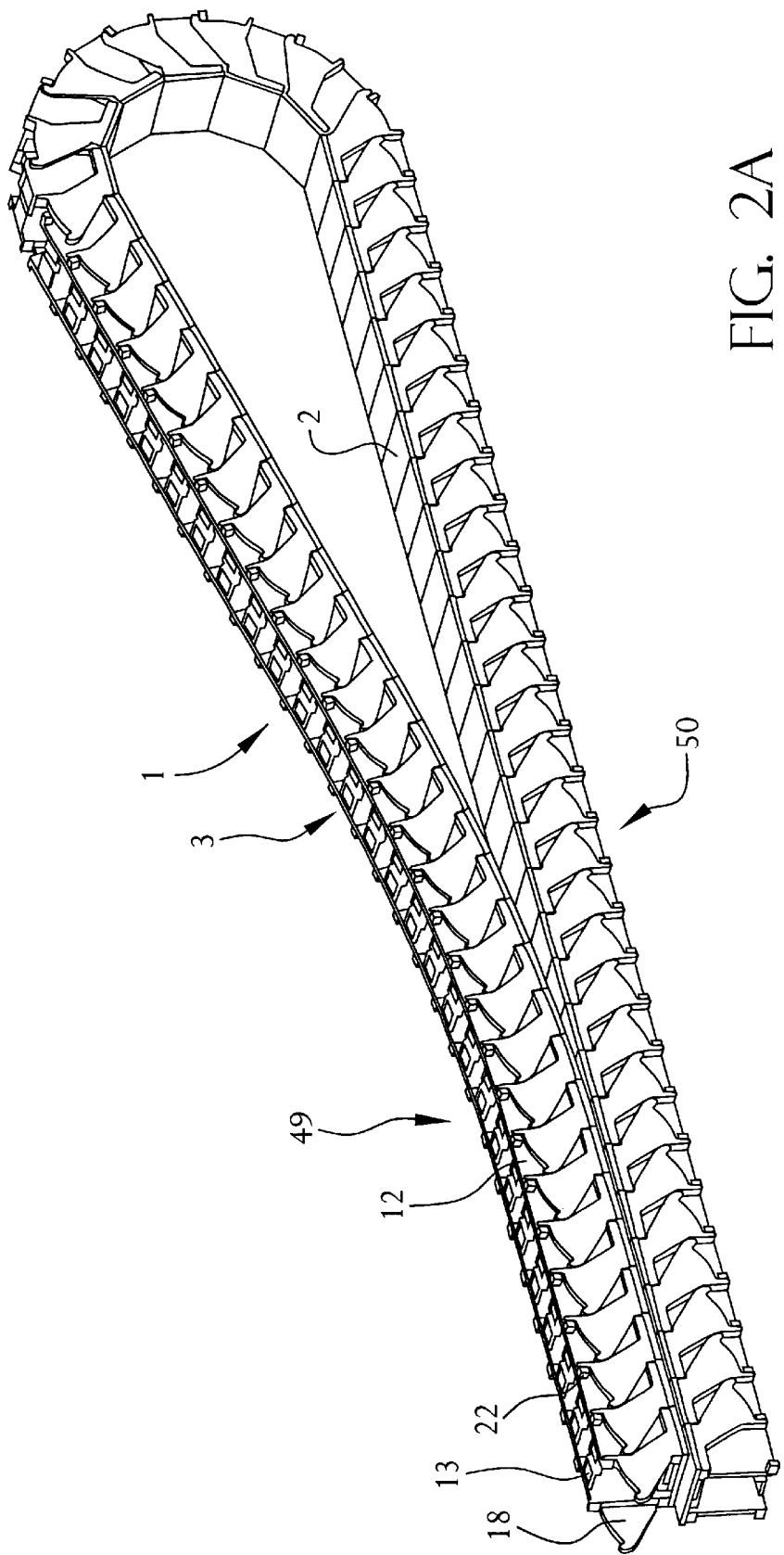
FIG. 2a A perspective view of the cable guide according to FIG. 1, with the side walls of the guide links cut away.

According to FIG. 2, side walls 12 of guide links 3 are of plate-like design and form a closed side wall when the cable guide is extended. The end of the box-like guide links opposite sliding strip 2 is limited by two cross-members 13, 14, which are integrally moulded on side walls 12 and have an overlapping section 15. Overlapping section 15 is flush with top 16 of side walls 12, so that cable guide 1 can also be placed in a guide channel, for example, on tops 16 of guide links 3. However, cross-members 13, 14 can also be positioned on side walls 12 at an offset height, for example. Cross-members 13, 14 each only extend over part of the length of guide links 3.

As FIGS. 1 and 2 show, side walls 12 are provided with central slots 17 which are engaged by essentially arc-shaped projections 18 with plane-parallel side surfaces, provided on the face ends of adjacent guide link 3b. Projections 18 extend in the pivoting plane of guide links 3 and are guided in slots 17 with only slight play, thus preventing the twisting of sliding strip 2.

Outer edge 19 of projection 18, which faces away from the associated guide link 3, serves as a stop surface which, when the cable guide is straight, can be brought into contact with bevel 20 limiting the side of slot 17.

Projection 18 is provided with a protruding section 21 facing away from sliding strip 2, the side of which facing the associated guide link 3 can be brought into contact with web 22 bridging slot 17, thus limiting the maximum pivoting angle of adjacent guide links. FIG. 2 shows projection 18 in its two maximum pivoting positions.

Figure 3:
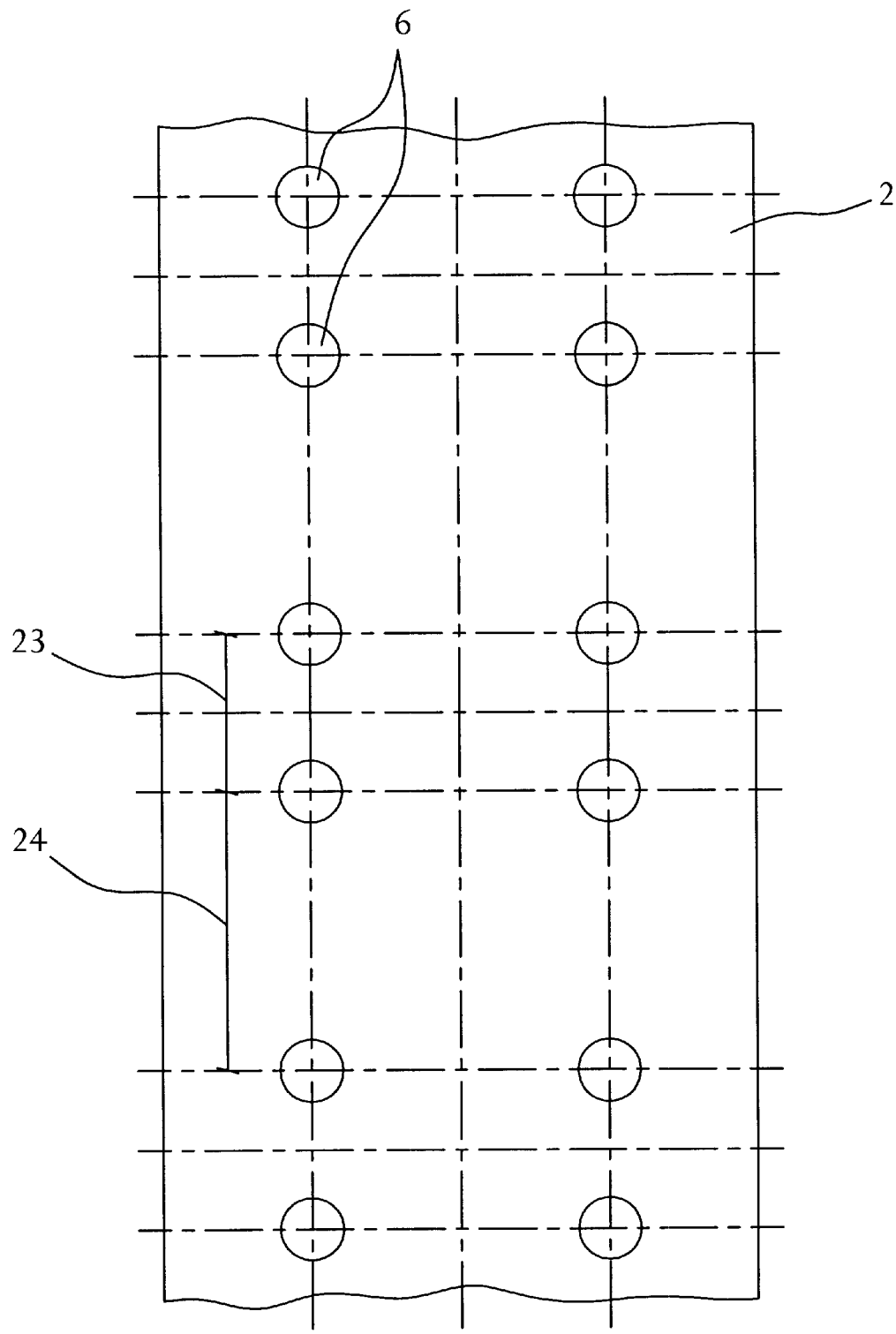
FIG. 3 A top view of a sliding strip.

As shown in FIG. 3, studs 6 for mounting guide links 3 are arranged in a double row on sliding strip 2 and are each positioned centrally between one of the outer edges and the centre line of the sliding strip. The studs are alternately spaced a short and long distance 23, 24 away from one another in the longitudinal direction of sliding strip 2 and are thus combined in groups of four studs which can be used to mount one guide link 3. The longer distance 24 forms a bending leg, the length of which is the primary determinant of the radius of the deflection zone of the cable guide.

Figure 4:
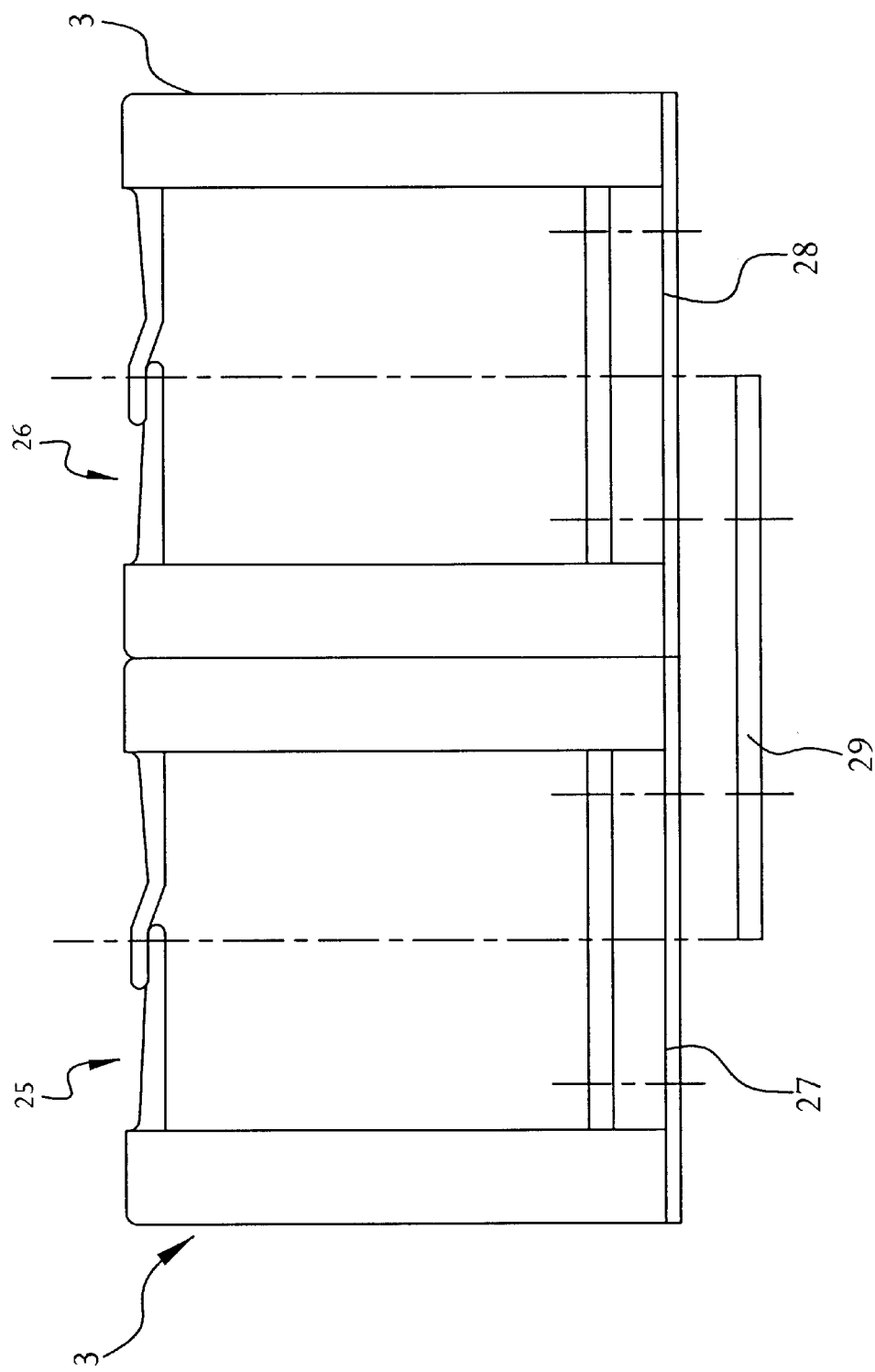
FIG. 4 A front view of a cable guide according to another configuration.

FIG. 4 shows a schematic drawing of a cable guide comprising two independent cable guides 25, 26, each of which consists of a sliding strip 27, 28 and guide links 3 mounted on it, in accordance with the configuration shown in FIG. 1. Sliding strips 27, 28 are connected to one another by another sliding strip 29, which is positioned symmetrically to cable guides 25, 26 and whose width corresponds to that of sliding strips 27, 28. Sliding strip 29 is mounted on sliding strips 27, 28 by suitable mounting devices and its design is identical to them. For this purpose, stud arrangements can be provided on sliding strip 29, as shown in FIGS. 1 to 3, where the studs engage corresponding recesses in the sliding strips positioned above them and can be positioned between the groups of studs used to mount one guide link each. As a result of this arrangement, the two cable guides 25, 26 can be moved back and forth together in their longitudinal direction.

Figure 5:
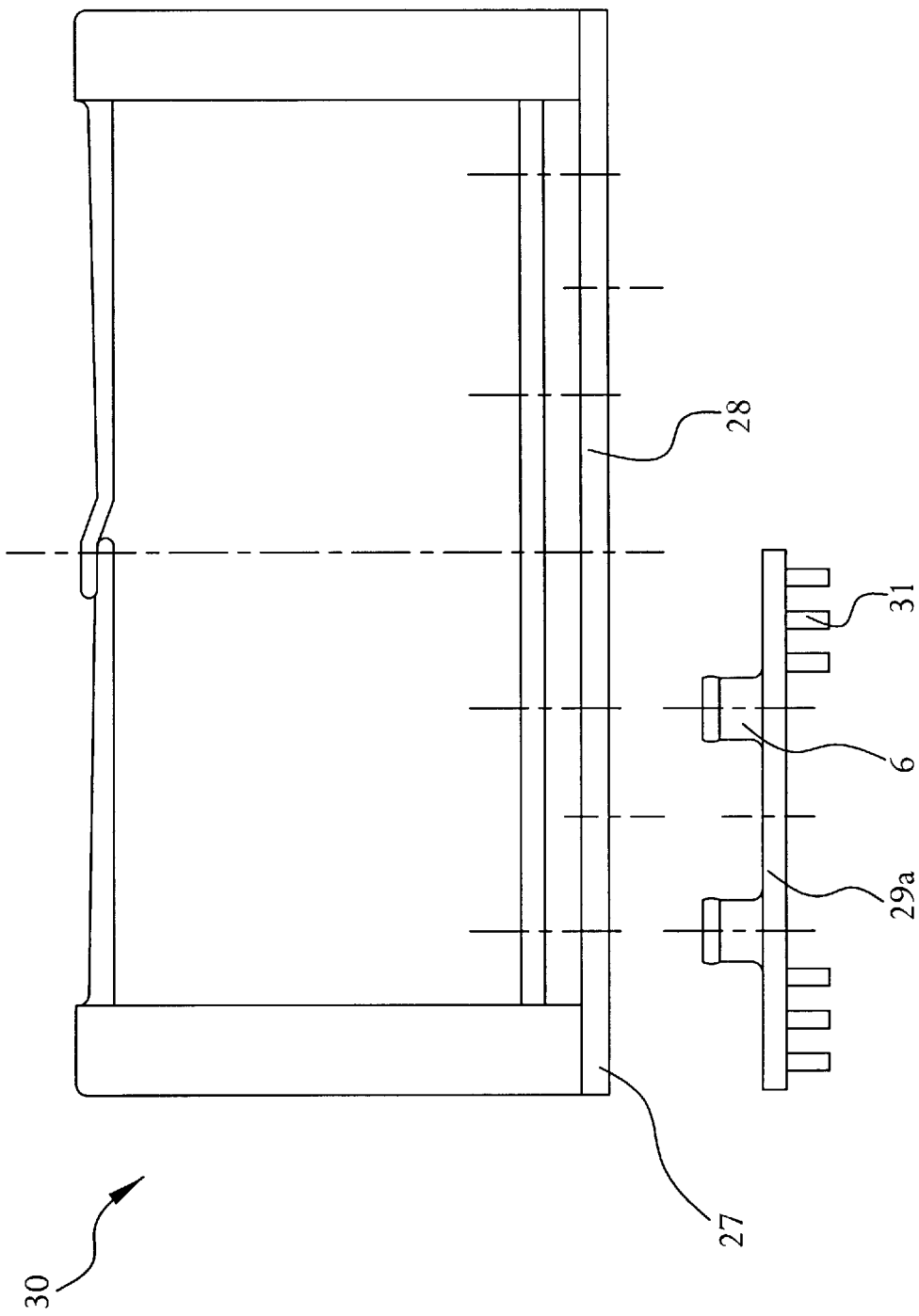
FIG. 5 Another configuration of a cable guide.

As shown in FIG. 5, guide link 30 can extend over two sliding strips 27, 28, which are connected to one another via guide link 30.

As shown in FIG. 5 (bottom), guide ribs 31 can be provided on the side of sliding strip 29*a* facing the opposite strand, where the distance between guide ribs 31 is dimensioned such that a guide rib of the opposite strand can be positioned between them. This provides for the meshing of the upper and lower strand and prevents the transverse shifting of the strands relative to one another. Sliding strip 29*a* can be mounted on the bottom of sliding strip 27 or in place of it.

Figure 6:
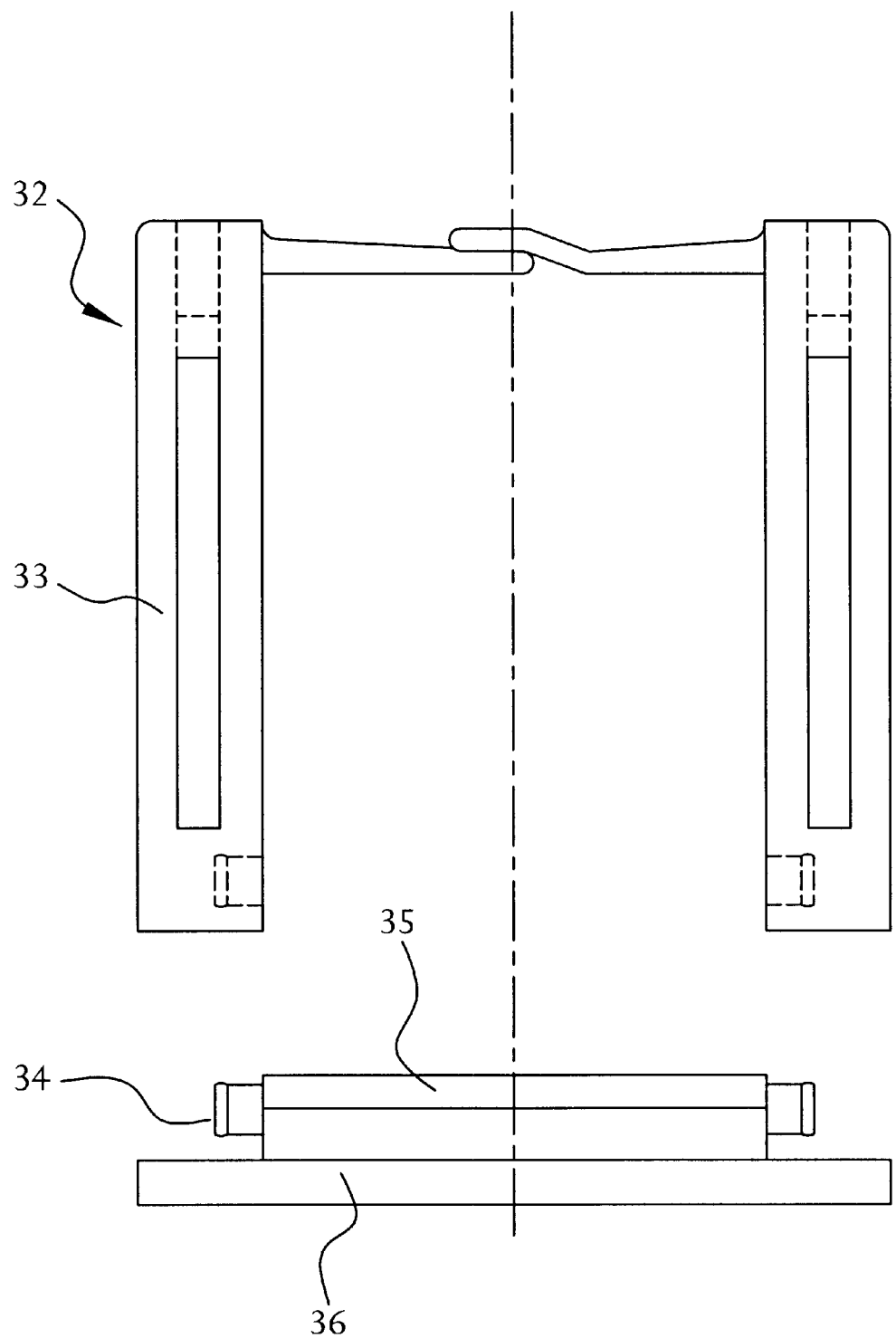
FIG. 6 A front view of a configuration of a cable guide with a two-part guide link, FIG. 7 A cross-section of a cable guide according to another configuration, FIG. 8a A top view of sliding strips of a different configuration according to FIG. 7, FIG. 8b A top view of sliding strips of a further configuration according to FIG. 7, FIG. 9 A side view of a cable guide according to FIG. 7, FIG. 10 A side view of a cable guide according to FIG. 7.

FIG. 6 shows an alternative configuration of a guide link 32, which limits the movement of the guided cables in three directions. The guide link consists of two parts, where side walls 33 can be mounted via snap projections 34 on webs 35, which are integrally moulded on sliding strip 36. The bottom of sliding strip 36 can act as a sliding surface.

FIGS. 7 to 10 show a cable guide according to an alternative configuration.

Figure 7:
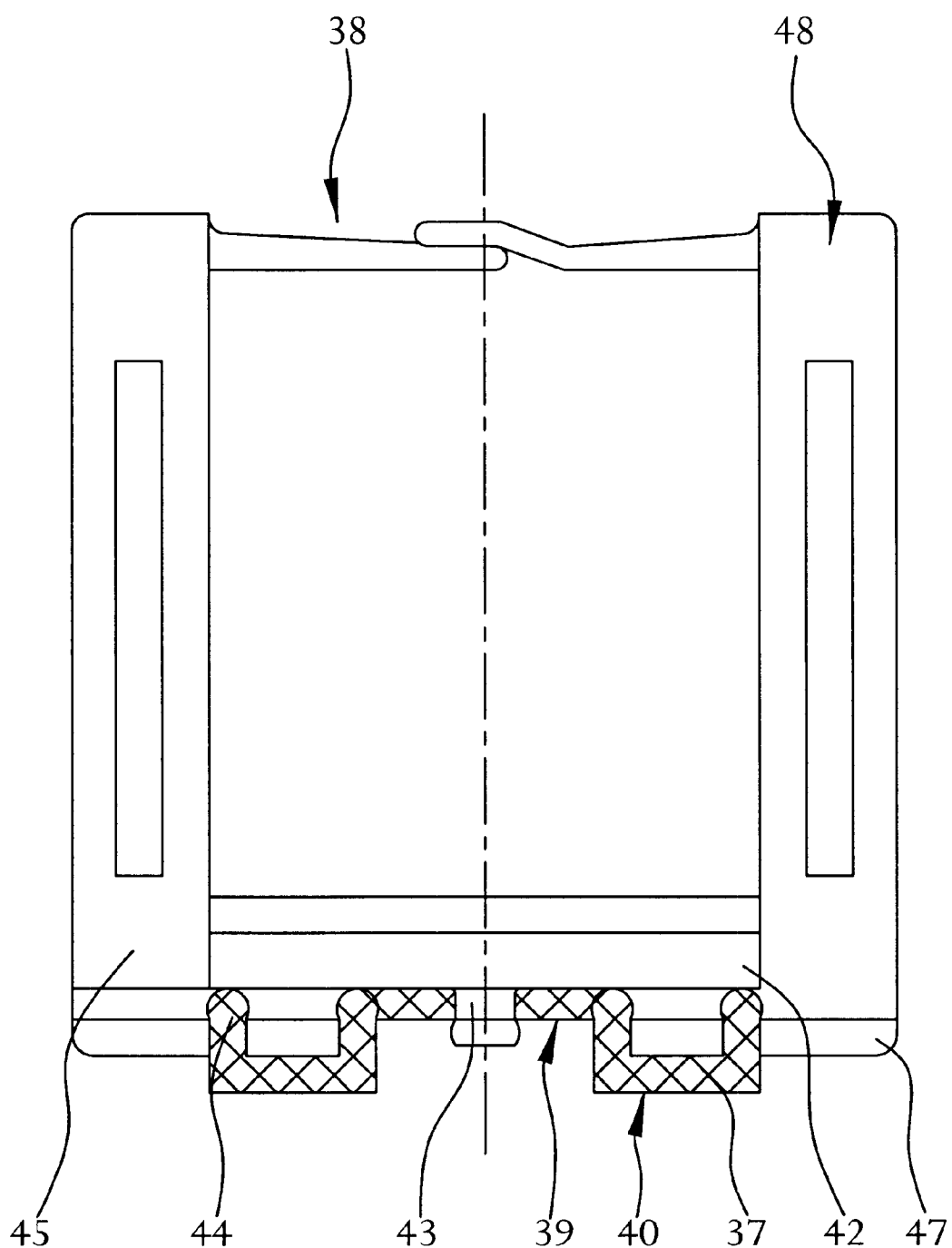

According to FIG. 7, sliding strip 37 is provided with a meandering profile which, relative to guide piece 38, thus forms receding areas 39 and protruding areas 40 with flat, sliding bottom surfaces. Receding areas 39 (see also FIG. 8) are provided with holes 41 for the snap connection of mounting studs 43 arranged on bottom parts 42 of the guide links. In this context, bottom part 42 rests on receding area 39 and on webs 44, which limit the sides of the sliding strip. Side walls 45 extend over part of the height of webs 44 and are in contact with them, such that the guide links are mounted on the sliding strip in torsion-resistant fashion.

Projection 18 (FIG. 9) guided in the slotted side wall of the adjacent guide link provides for torsion-free movement of the cable guide and acts as a stop when moving the cable guide into its extended position. Bevels 47, which are provided on face ends 48 of side walls 45 at the height of sliding strip 37, limit the pivoting motion of the guide links in deflection zone 46 of the cable guide.

Figure 8A:
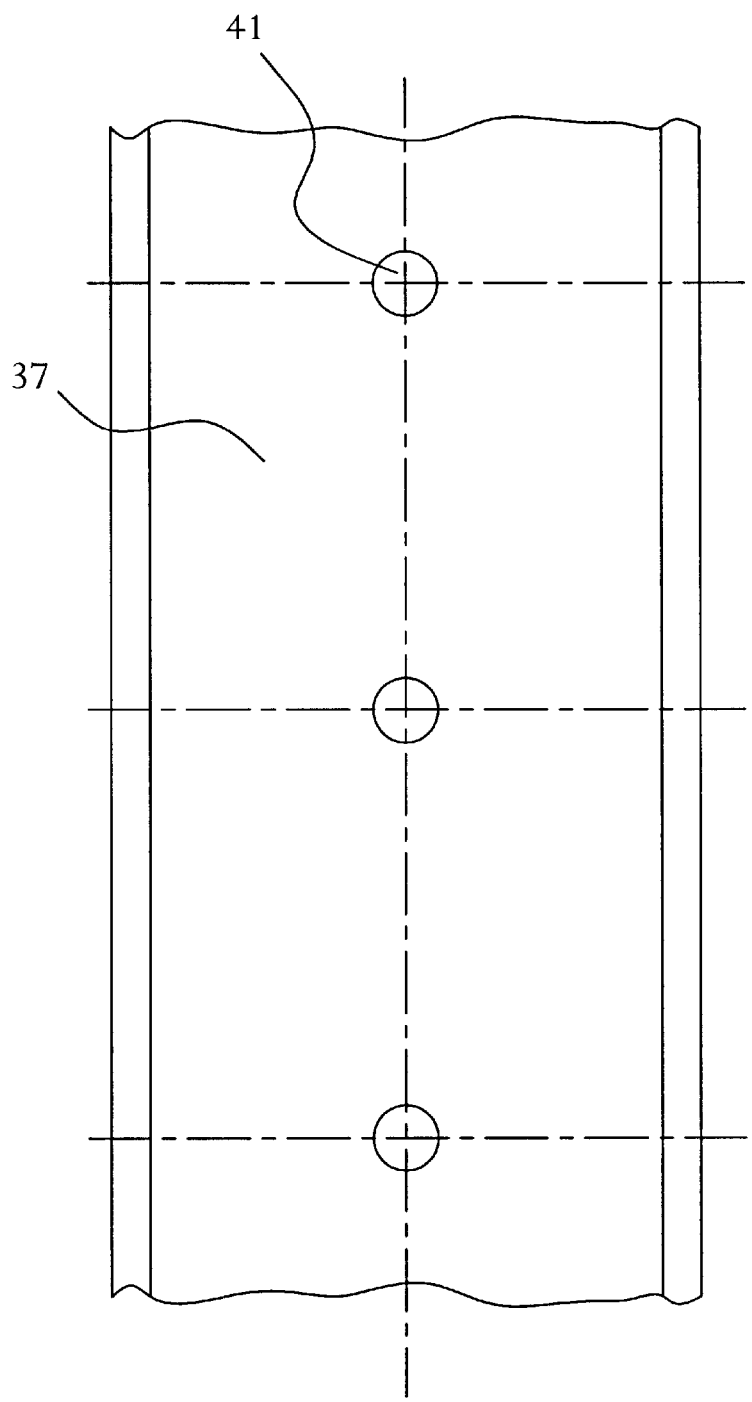
Figure 8B:
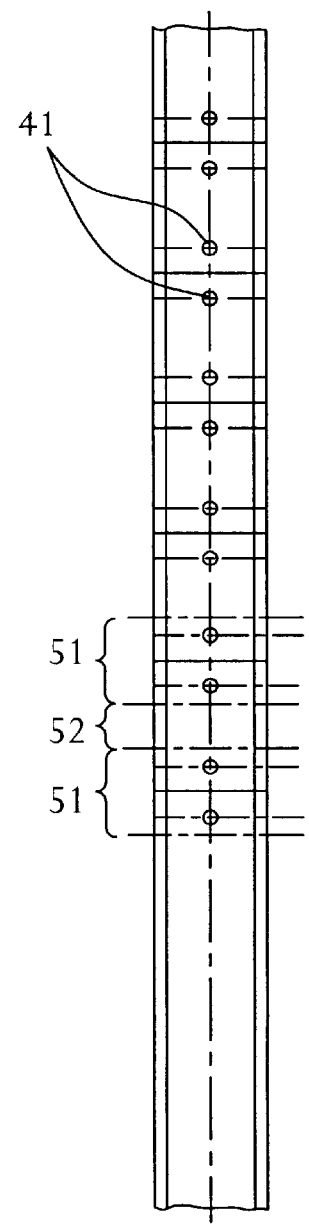
Figure 9:
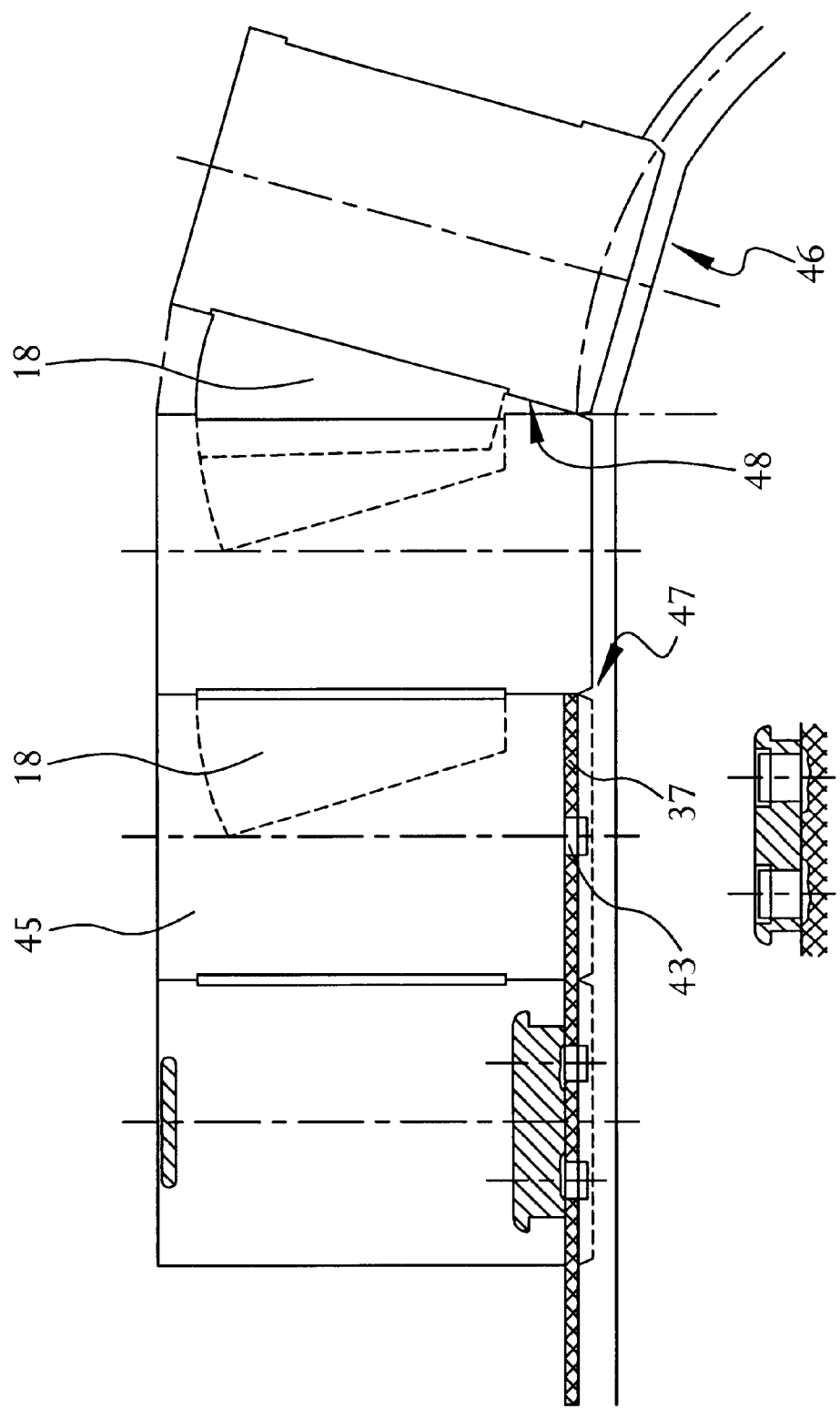

According to FIG. 8, sliding strip 37 is provided with a row of uniformly spaced holes 41 to accommodate mounting devices, where the guide links can have one, two or even several mounting studs, depending on the configuration. According to FIG. 8A, the sliding strip has a row of holes 41 alternately spaced a short and long distance apart, where two closely-spaced adjacent holes serve to mount one guide link. Mounting areas 51 for the guide links are made of a material of lower elasticity than the bending areas 52 located between them.

Figure 10:
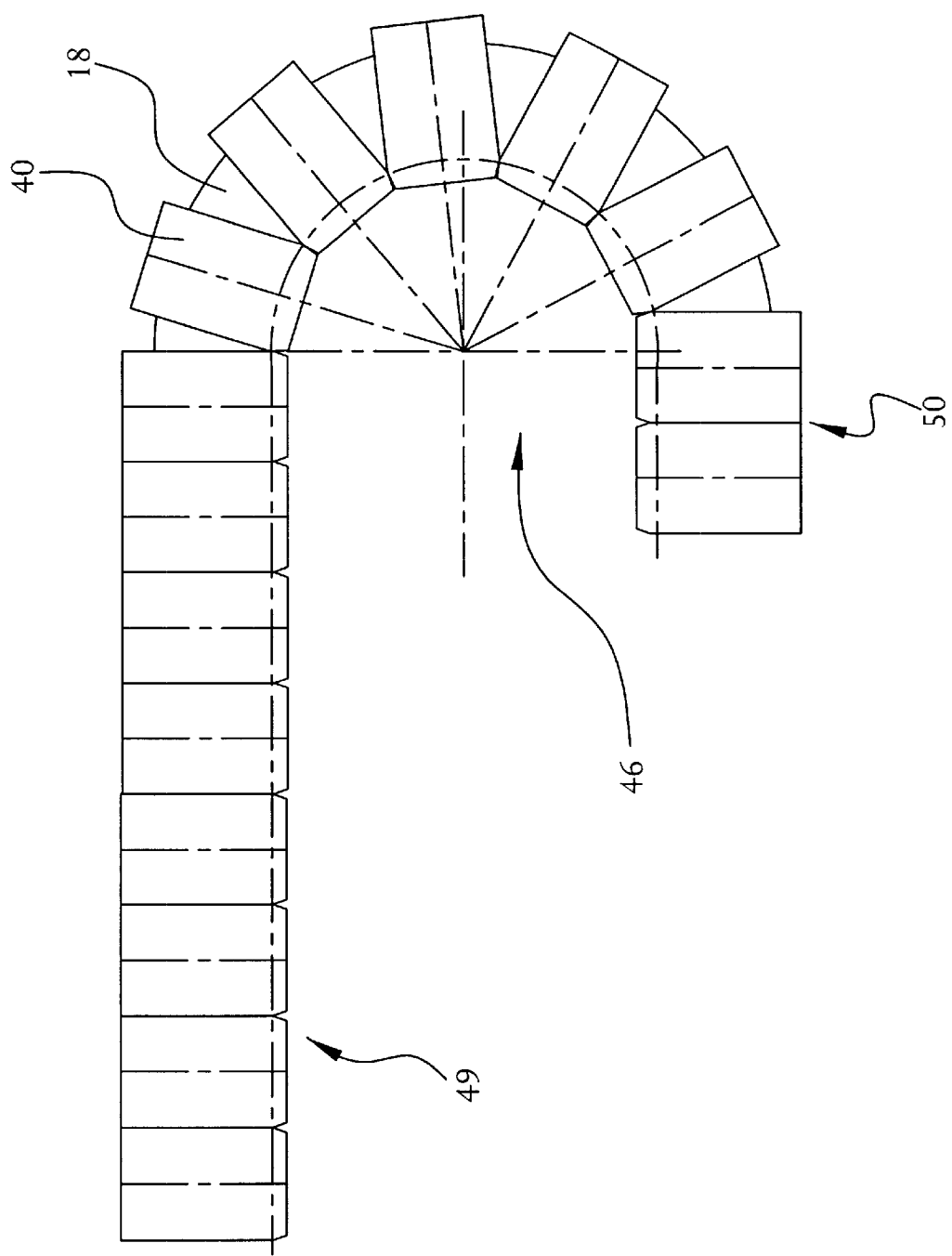

FIG. 10 shows a side view of a cable guide with upper strand 49, deflection zone 46 and lower strand 50. In the deflection zone, projections 18 for lateral guidance of the cable guide protrude from the slots provided in side walls 40 and form an essentially closed side wall. Instead of a self-supporting upper strand, an upper strand guided on top of the lower strand can be obtained owing to the inevitable tolerances or by tapering side walls 40 towards the end facing away from the sliding strip.

LIST OF REFERENCE NUMBERS

1 Cable guide
2 Sliding strip
3 Guide link
3*a* Guide channel
3*b* Guide link
4 Bottom side
5 Top side
6 Stud
7 Circular rim
8 Recess
9 Bottom part
10 Web
11 Edge
12 Side wall
13 Cross-member
14 Cross-member
15 Overlapping section
16 Top
17 Slot
18 Projection
19 Outer edge
20 Bevel
21 Protruding section
22 Web
23 Distance
24 Distance
25 Cable guide
26 Cable guide
27 Sliding strip
28 Sliding strip
29 Sliding strip
29*a* Sliding strip
30 Guide link
31 Guide rib
32 Guide link
33 Side wall
34 Snap projection
35 Web
36 Sliding strip 37 Sliding strip
38 Guide link
39 Receding area
40 Protruding area
41 Hole
42 Bottom part
43 Stud
44 Web
45 Side wall
46 Deflection zone
47 Bevel
48 Face end
49 Upper strand
50 Lower strand
51 Area of low elasticity
52 Area of high elasticity

What is claimed is:

1. A cable guide for guiding cables or lines in a guide channel, the cable guide comprising a continuous, elongated sliding strip having two sides, wherein the guide channel consists of numerous guide links, which can pivot relative to one another and which are mounted on one side of the sliding strip, and wherein the strip is arrangeable to form a lower strand, a deflection zone and an upper strand that is guided above the lower strand and can be positioned on top of the lower strand in a sliding fashion with said one side of said sliding strip in each said strand facing away from the other said strand, enabling said upper strand of said sliding strip to slide on said lower strand, where one end of the cable guide is connectable to a stationary unit and the other end to a reciprocating unit, and wherein the guide links are mounted on the sliding strip in a detachable fashion.

2. A cable guide according to claim 1, wherein the guide links are designed such that they form a guide channel together with the sliding strip.

3. A cable guide according to claim 1, wherein the guide links are designed such that they limit the movement of the guided cables in four directions perpendicular to the longitudinal direction of the sliding strip.

4. A cable guide according to claim 1, further comprising means for mounting the guide links integrally moulded on the sliding strip.

5. A cable guide according to claim 1, wherein the sliding strip is provided with snap elements, with which the guide links can be snapped onto the sliding strip when moved in the direction normal to the sliding strip.

6. A cable guide according to claim 1, wherein the sliding strip is provided with mounting devices, with which the guide links can be mounted on the sliding strip by being slid in a direction parallel to the plane of the sliding strip.

7. A cable guide according to claim 1, wherein the sliding strip is profiled, forming protruding and receding areas extending in the longitudinal direction of the sliding strip.

8. A cable guide according to claim 1, wherein the guide links are provided with stops to limit the pivoting angle of adjacent sections of the sliding strip.

9. A cable guide according to claim 8, wherein ends of the guide links that face adjacent guide links are provided with bevels which act as stop surfaces.

10. A cable guide according to claim 8, wherein the guide links are provided with projections extending in the direction of the adjacent guide link, which reach behind an area of the adjacent guide link and can be brought into contact with it, thereby limiting the pivoting angle of the guide links.

11. A cable guide according to claim 1, wherein guide elements are provided which limit the movement of the guide links perpendicular to their pivoting plane.

12. A cable guide according to claim 11, wherein the guide elements are designed as guide ribs arranged on the side facing the opposite strand and laterally spaced apart from one another, which can be positioned between adjacent guide ribs of the opposite strand.

13. A cable guide according to claim 11, wherein the guide elements are designed as projections facing the adjacent guide link, which reach around the side of a section of the adjacent guide link.

14. A cable guide according to claim 1, wherein the sliding strip has sections alternating in the longitudinal direction of the cable guide having higher and lower flexural resistance relative to the pivoting plane of the guide links.

15. A cable guide according to claim 1, wherein devices for mounting the guide links are mounted on the sliding strip such that several said guide links can be mounted next to one another on one sliding strip or one guide link on several adjacent sliding strips.

16. A cable guide according to claim 1, wherein additional means are provided in order to laterally connect adjacent sliding strips such that they can be moved together in their longitudinal direction.

17. A cable guide according to claim 1, further comprising studs for mounting the guide links, wherein the studs are arranged in a double-row on the sliding strip and being alternatively spaced by a short and a long distance in the longitudinal direction of the sliding strip and are combined in groups of four studs, and wherein one guide link is mountable by means of a group of four studs.

* * * * *